(12) United States Patent
Schisla

(10) Patent No.: US 6,184,307 B1
(45) Date of Patent: Feb. 6, 2001

(54) MINIMUM RESIDENCE TIME HYDROGENATION PROCESS FOR POLYISOPRENE-POLYBUTADIENE BLOCK COPOLYMERS

(75) Inventor: David Karl Schisla, Amsterdam (NL)

(73) Assignee: Shell Oil Company, Houston, TX (US)

( * ) Notice: Under 35 U.S.C. 154(b), the term of this patent shall be extended for 0 days.

(21) Appl. No.: 09/234,336

(22) Filed: Jan. 20, 1999

Related U.S. Application Data

(60) Provisional application No. 60/073,178, filed on Jan. 30, 1998.

(51) Int. Cl.⁷ .................. C08F 136/06; C08F 136/08; C08F 8/04
(52) U.S. Cl. .............. 525/333.1; 525/338; 525/313; 525/314; 525/95; 525/98
(58) Field of Search ................ 525/333.1, 338, 525/313, 314, 95, 98

(56) References Cited

U.S. PATENT DOCUMENTS 3,465,063 * 9/1969 Hassell et al. .................. 525/314

* cited by examiner

Primary Examiner—James J. Seidleck
Assistant Examiner—Olga Asinovsky
(74) Attorney, Agent, or Firm—Donald F. Haas

(57) ABSTRACT

This invention is a method for producing butadiene-isoprene block copolymers with a specified amount of residual unsaturation in the polyisoprene blocks utilizing a hydrogenation catalyst wherein the hydrogenation residence time is minimized.

18 Claims, 1 Drawing Sheet

MINIMUM RESIDENCE TIME HYDROGENATION PROCESS FOR POLYISOPRENE-POLYBUTADIENE BLOCK COPOLYMERS

This application claims the benefit of U.S. Provisional Application No. 60/073,178, filed Jan. 30, 1998, the entire disclosure of which is hereby incorporated by reference.

FIELD OF THE INVENTION

This invention relates to the production of hydrogenated block copolymers made from isoprene and butadiene. More particularly, this invention relates to a process that minimizes the residence time of the hydrogenation step in the production of polyisoprene-polybutadiene block copolymers which are intended to incorporate a small amount of residual unsaturation in the polyisoprene blocks.

BACKGROUND OF THE INVENTION

U.S. Pat. Nos. 5,229,464 and 5,382,604 describe conjugated diene block copolymers which have at least one block each of two different polymerized conjugated dienes. In their preferred embodiments, the conjugated dienes are isoprene and butadiene. The patents describe methods for making such polymers and then hydrogenating them in order to as completely as possible hydrogenate the polybutadiene blocks while leaving a certain amount of residual unsaturation in the polyisoprene blocks. This residual unsaturation may then be reacted to attach epoxy groups to the polymer or some other functionality. Generally, the hydrogenation process described utilizes a nickel-aluminum catalyst as described in U.S. Pat. No. 4,879,349 but other Group VIII metals and titanium catalysts have been used as well as described in U.S. Pat. No. 5,039,755.

Polybutadiene is known to be relatively easy to hydrogenate whereas polyisoprene is more difficult to hydrogenate. The rates of hydrogenation of both of the main microstructure configurations of polybutadiene, 1,2-butadiene and 1,4-butadiene, are higher than the rate of hydrogenation of the main microstructure configuration in polyisoprene, 1,4-isoprene. The rate of hydrogenation of 1,4-butadiene is noticeably faster than that of 1,4-isoprene and the rate of hydrogenation of 1,2-butadiene is noticeably faster than that of 1,4-butadiene. Thus it can be seen that the hydrogenation of the polyisoprene blocks in polybutadiene-polyisoprene block copolymers can be a rate limiting step in the overall process for the production of hydrogenated polybutadiene-polyisoprene block copolymers.

The current mode of hydrogenating such block copolymers involves two stages. In the first stage, the focus is on hydrogenating the polybutadiene blocks as completely as possible, for example to a residual unsaturation of 0.3 meq/g, which for a 4800 number average molecular weight butadiene block is equivalent to a total butadiene double bond conversion of 95% as shown in Example 3 below. Residual unsaturation in this sense means the milliequivalents of unsaturated double bonds per gram of polymer which are left in the polymer block after the hydrogenation step. Residual unsaturation is thus defined once the total conversion of double bonds as a percentage is known and the molecular weight of the polymer or the polymer block is known or chosen. In the second stage, more stringent conditions or more catalyst are utilized to hydrogenate the polyisoprene blocks to the desired level.

The biggest problem with this approach is that the total hydrogenation part of the process can become the rate-limiting step in the process. If a way could be found to reduce the residence time or cycle time of the hydrogenation part of the process, the overall cost of producing such polymers could be significantly decreased. Residence time is the average time the polymer cement spends in a continuous hydrogenation in a batch reactor. Cycle time is the complete time taken to complete the hydrogenation in a batch reactor. These terms are used interchangeably herein.

One obvious way to attempt to speed up the hydrogenation of the polyisoprene blocks is to add more hydrogenation catalyst. Obviously, this increases the cost as the hydrogenation catalyst itself is expensive. Unfortunately, the variability in catalyst activity can make it difficult to target a particular polyisoprene block residual unsaturation. Adding more catalyst to increase the rate of hydrogenation also increases the risk of overshooting the target residual unsaturation. If a narrow specification is required for residual unsaturation, this method is not very effective.

It can be seen that it would be highly advantageous to find a method which would allow one to produce polybutadiene-polyisoprene block copolymers in which the polybutadiene block is almost completely hydrogenated while leaving a specified amount of residual unsaturation within a narrow specification range in the polyisoprene block and doing so at an overall rate that minimizes the residence time of the hydrogenation step. This would allow a cost effective method for producing such hydrogenated polybutadiene-polyisoprene block copolymers.

SUMMARY OF THE INVENTION

The present invention describes such a method for minimizing the hydrogenation residence time during the production of hydrogenated polybutadiene-polyisoprene block copolymers. The method focuses on producing a molecule that contains the desired amount of residual unsaturation in the polybutadiene blocks and also the targeted residual unsaturation in the polyisoprene blocks.

This invention is a method for producing such polymers with a specified amount of residual unsaturation in the polyisoprene blocks utilizing a hydrogenation catalyst wherein the hydrogenation cycle time is minimized. Simply stated, the method adjusts the relative amounts of butadiene and isoprene in the polymer such that the desired level of residual unsaturation in the isoprene block is achieved at the same time the desired degree of butadiene hydrogenation is attained. In other words, the required hydrogenation of the butadiene and isoprene run co-currently and end simultaneously so that no additional time beyond butadiene hydrogenation is required for isoprene hydrogenation. This is obviously the case of minimum cycle or residence time for the hydrogenation.

A more detailed methodology for defining this optimized family of molecules comprises:

a) determining the average relative rates of hydrogenation of 1,2-butadiene to 1,4-butadiene (S1) and 1,4-butadiene to 1,4-isoprene (S2) of the particular batch of hydrogenation catalyst to be used, including whether or not the rates change significantly as the conversion increases, b) choosing the desired polybutadiene block residual unsaturation ($RU_{Bd}$), c) choosing the desired polyisoprene block residual unsaturation ($RU_{Ip}$) whereby the desired total residual unsaturation ($RU_{Tot}$) is defined, d) choosing the desired overall polymer molecular weight or the desired butadiene block molecular weight, e) determining the relative molecular weight ratio of the polyisoprene blocks to the polybutadiene blocks polymer from the following equation:

$$RU_{Tot}=1000\{[F_{Bd}((1-V_{1,2})(1-14BdC)+V_{1,2}(1-14BdC)^{S1})]/54 + [F_{Ip}(1-14BdC)^{1/S2}]/68\}$$

whereby $F_{Bd}$ is the weight fraction of polybutadiene in the polymer, $F_{Ip}$ is the weight fraction of polyisoprene in the polymer, $V_{1,2}$ is the weight fraction of 1,2-butadiene mers in the polybutadiene blocks, and 1,4BdC is the fraction of 1,4-butadiene which is hydrogenated, thereby defining the overall polymer molecular weight and the polybutadiene and polyisoprene block molecular weights, f) anionically polymerizing butadiene and isoprene to form a block copolymer having the block molecular weights as determined in step e), and g) hydrogenating the block copolymer to the desired polybutadiene residual unsaturation.

If the relative rates S1 and/or S2 change significantly at any point during the course of the hydrogenation step, i.e., as a function of the amount of conversion of double bonds, then steps a through g are carried out using the first set of rates up to the amount of conversion at which the significant rate change is observed and then steps a through g are repeated using the new values for S1 and S2. This is repeated as many times as there are points at which there are significant changes in the relative rates S1 and/or S2.

DETAILED DESCRIPTION OF THE INVENTION

Figure 1:
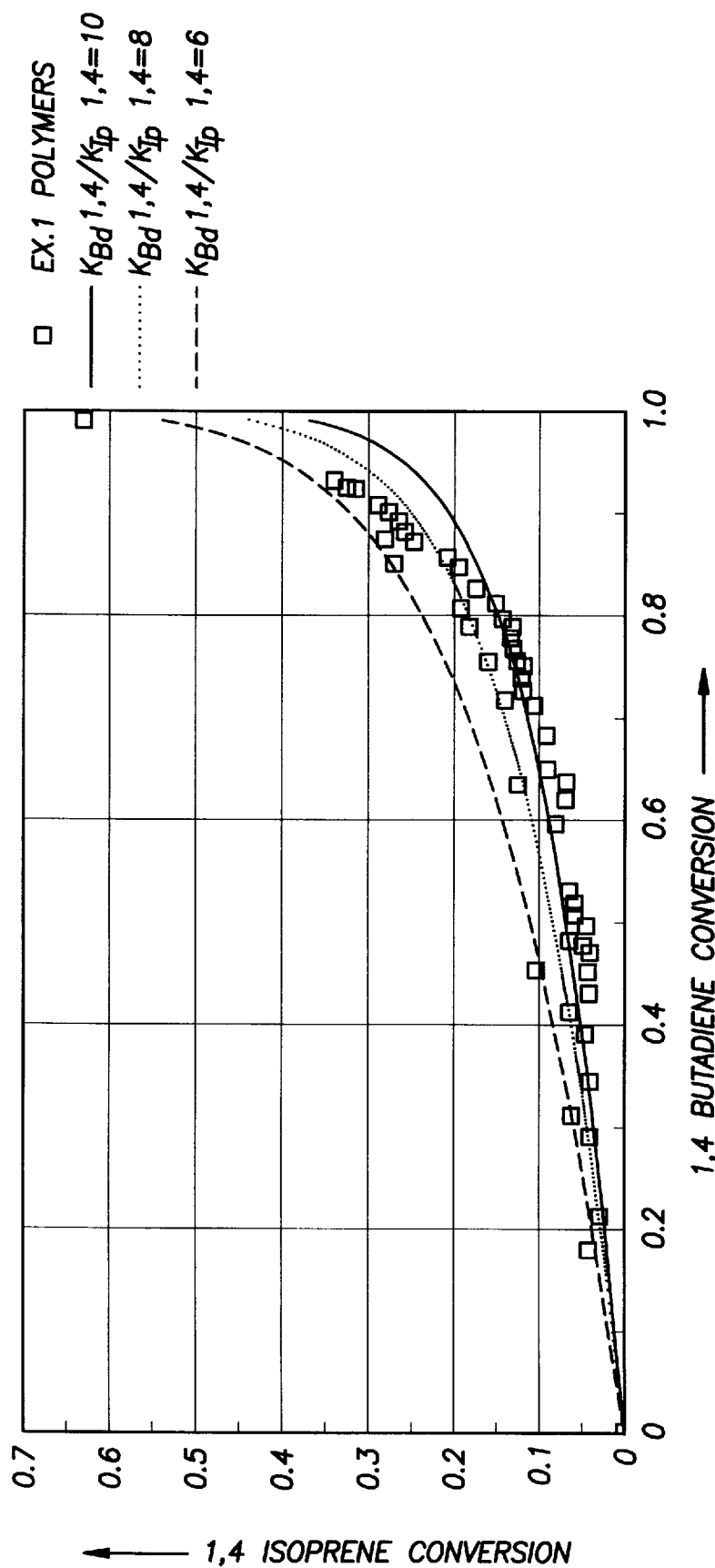
FIG. 1 is a plot of 1,4-isoprene conversion vs. 1,4-butadiene conversion for the three hydrogenations carried out in Example 1.

The polymers of this invention contain ethylenic unsaturation and may also contain aromatic unsaturation in the form of incorporated vinyl aromatic hydrocarbon blocks or randomly distributed mers. The polymers are prepared by anionic polymerization using anionic initiators or polymerization catalysts. Such polymers may be prepared using bulk, solution, or emulsion techniques. When polymerized to high molecular weight, such a polymer containing ethylenic unsaturation will, generally, be recovered as a solid such as a crumb, a powder, a pellet, or the like. When polymerized to low molecular weight, it may be recovered as a liquid. Methods for polymerizing the polymers of the present invention are described in U.S. Pat. Nos. 5,229,464 and 5,382,604. The disclosures of these two patents are incorporated herein by reference.

In general, when solution anionic techniques are used, copolymers of conjugated diolefins, optionally with vinyl aromatic hydrocarbons, are prepared by contacting the monomer or monomers to be polymerized simultaneously or sequentially with an anionic polymerization initiator such as group IA metals, their alkyls, amides, silanolates, naphthalides, biphenyls or anthracenyl derivatives. It is preferred to use an organo alkali metal (such as sodium or potassium) compound in a suitable solvent at a temperature within the range from about −150° C. to about 300° C., preferably at a temperature within the range from about 0° C. to about 100° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to about 20 carbon atoms and n is an integer of 1 to 4.

The block copolymers of this invention contain blocks of polymerized 1,3-butadiene and polymerized isoprene. Alkenyl(vinyl) aromatic hydrocarbons may also be copolymerized in separate blocks or randomly distributed in the polybutadiene or polyisoprene blocks. Suitable vinylaromatic hydrocarbons include styrene, various alkyl-substituted styrenes alkoxy-substituted styrenes, vinylnaphthalene, alkyl-substituted vinylnaphthalenes, and the like.

In general, any of the solvents known in the prior art to be useful in the preparation of such polymers may be used. Suitable solvents include straight and branched chain hydrocarbons such as pentane, hexane, heptane, octane, and the like, as well as alkyl-substituted derivatives thereof, cycloaliphatic hydrocarbons such as cyclopentane, cyclohexane, cycloheptane, and the like as well as alkyl-substituted derivatives thereof, aromatic and alkyl-substituted aromatic hydrocarbons such as benzene, naphthalene, toluene, xylene, and the like; hydrogenated aromatic hydrocarbons such as tetralin, decalin, and the like; linear and cyclic ethers such as dimethylether, methylethylether, diethylether, tetrahydrofuran, and the like.

In the process of this invention, the hydrogenation is carried out in one stage rather than in two stages as described above for the prior art method. In this invention, process conditions (i.e., temperature, pressure, and catalyst concentration) can be varied in any way desirable to change the selectivities S1, S2, and S2'. Furthermore, as discussed within, there is a theoretical basis for assuming that the variability of the selectivities should not be a strong function of temperature, hydrogen pressure, and catalyst concentration over a typical, but not necessarily limited, range of process conditions. Hence the methodology used here should be relatively insensitive to typical variability in other key process parameters and any such variability can be accounted for in the measured selectivities.

The polymers of this invention may be hydrogenated as disclosed in U.S. Pat. No. Reissue 27,145 which is herein incorporated by reference. The hydrogenation of these polymers and copolymers may be carried out by a variety of well established processes including hydrogenation in the presence of such catalysts as Raney Nickel, noble metals such as platinum and the like, soluble transition metal catalysts and titanium catalysts as in U.S. Pat. No. 5,039,755 which is also incorporated herein by reference. The polymers may have different diene blocks and these diene blocks may be selectively hydrogenated as described in U.S. Pat. No. 5,229,464 which is also incorporated herein by reference.

U.S. Pat. Nos. 3,415,759 and 5,057,582, which are herein incorporated by reference, describe catalysts and methods for hydrogenating chemical compounds containing ethylenic and/or aromatic unsaturation. Preferred catalysts for use herein are made by contacting one or more Group VIII metal carboxylates (CAS version, Group VIIIA in the previous IUPAC form, and Groups VIII, IX and X in the new notation) with one or more alkyl alumoxanes which were prepared by reaction of an aluminum alkyl with water. Such catalysts produce excellent results in that they selectively hydrogenate ethylenic unsaturation to a high degree while basically unaffecting the aromatic unsaturation. Other excellent hydrogenation catalysts utilize the aluminum alkyl directly.

The intent here is to hydrogenate the polybutadiene and polyisoprene blocks at the same time, taking advantage of the fact that the polybutadiene blocks will hydrogenate faster than the polyisoprene blocks will. The desired amount of residual unsaturation in the polyisoprene blocks is achieved by using polyisoprene blocks of a molecular weight that is more "process friendly." In this context, it means that the polyisoprene blocks are smaller in molecular weight than taught by the prior art, assuming the degree of butadiene hydrogenation is held constant. Since the polyisoprene residual unsaturation is typically smaller, the total amount of unsaturation to be hydrogenated is also smaller and it takes less time to perform the hydrogenation. Thus, the polyisoprene blocks are hydrogenated to the desired degree in the same amount of time as the polybutadiene blocks are almost completely hydrogenated.

In order to choose the optimum size for the polyisoprene block or, in other words, the optimum molecular weight ratio of the polyisoprene block to the polybutadiene block, it is necessary to determine the rates of hydrogenation of the different microstructures of the butadiene used and also of the isoprene used. These rates of hydrogenation will depend upon the efficacy or selectivity of the catalyst used. The selectivity often varies from catalyst batch to catalyst batch and, of course, will vary when parameters such as the nickel/aluminum ratio are changed.

The methodology used to identify the process with the minimal cycle time is derived from fundamentals of chemical kinetics. The reaction rate per unit volume of the ith mer can be defined as follows:

$$\frac{dC_i}{dt} = -k_i f(C_{H2}, C_{cat}) C_i \quad (1)$$

where $f$ is a function relating the effect of hydrogen concentration ($C_{H2}$) and catalyst concentration ($C_{cat}$) to rate of disappearance of the ith mer ($C_i$). While not wishing to be held to any particular theory, it is believed that the hydrogen and catalyst concentration will affect the hydrogenation rate of each mer in a similar manner, such that the function $f$ define above is the same or very similar for each mer. This should be an excellent approximation for the hydrogenation of isoprene-butadiene polymers when mass transfer does not limit the reactions. This limitation typically does not exist in these hydrogenation systems. Also, while the rate constants $k_i$ are a function of temperature, the ratio of the reaction rates of the hydrogenation reactions (i.e. the selectivity) should be a weak function of temperature over a typical range of operating conditions. The reaction rates are believed to be first order in mer concentration.

Butadiene is made up of mers of several different microstructures. The predominant microstructures are 1,2-butadiene and 1,4-butadiene. Isoprene has microstructures of 1,4-isoprene and 3,4-isoprene. In the examples below, the 1,4-isoprene content is approximately 90 percent. Also, for nickel/aluminum catalyst systems, the rate of hydrogenation of 1,4 and 3,4-isoprene mers is about the same. Thus the total conversion of isoprene is approximately the same as the conversion of 1,4-isoprene. This will be true even if the 3,4-isoprene content is much higher in another system because the rates of hydrogenation are about the same. In summary, the equations and methodology used to derive equations (3) and (4) can easily be extended to account for all levels of 3,4-isoprene. If, under some other set of process conditions, the 1,4- and 3,4-isoprene should be significantly different and a larger amount of 3,4-isoprene is present, the calculation described below will be more complicated but will be carried out in the same manner.

Assuming the functions for the hydrogenation and nickel concentrations are the same for all isomers, the ratio of the above kinetic expression for the 1,4-butadiene molecule and the 1,4-isoprene molecule is $$\frac{dC_{Bd1,4}}{dC_{Ip1,4}} = \frac{k_{Bd1,4} C_{Bd1,4}}{k_{Ip1,4} C_{Ip1,4}} \quad (2)$$

where $Bd_{1,4}$ represents the 1,4-butadiene mer and $Ip_{1,4}$ represents the 1,4-isoprene mer.

Integrating equation (2) and rearranging gives the following relationship between 1,4-butadiene and 1,4-isoprene conversion:

$$Ip1,4\,\text{Conversion} = 1 - (1 - Bd1,4\,\text{Conversion})^{\frac{k_{Ip1,4}}{k_{Bd1,4}}} \quad (3)$$
$$= 1 - (1 - Bd1,4\,\text{Conversion})^{\frac{1}{S2}}$$

The ratio of the rate constant of 1,4-butadiene to that of 1,4-isoprene is defined as S2. A similar equation can be derived for the 1,2 and 1,4 butadiene mers, using equation (1) and this same methodology:

$$\text{Total } Bd\text{ Conversion} = 1 - \left[(1 - V_{12})(1 - Bd1,4\,\text{Conversion}) + V_{12}(1 - Bd1,4\,\text{Conversion})^{\frac{k_{Bd1,2}}{k_{Bd1,4}}}\right] \quad (4)$$

where the ratio $k_{Bd1,2}$ to $k_{bD1,4}$ can be represented as S1, and $V_{12}$ represents the fraction of 1,2-butadiene in the butadiene block polymer backbone. These equations serve as the basis for defining the minimal residence time for hydrogenation process.

The relative amount of 1,2-butadiene mers in the polymer to 1,4-butadiene mers can be modified by known means using microstructure control agents. This is well known in the prior art and is described in U.S. Pat. No. Reissue 27,145 which is herein incorporated by reference. In a preferred embodiment of this invention, the polymers herein have a 1,2-butadiene content of from 40 to 60 percent by weight. The relative amount of 1,2-butadiene as compared to 1,4-butadiene must be determined in advance in order to follow the process of the present invention. In the following analysis the weight fraction of 1,2-butadiene in the polybutadiene blocks is $V_{12}$. Microstructure agents can also be used to modify the relative amount of 1,4 and 3,4 isoprene. In a preferred embodiment of this invention, the polymers herein have a 1,4 isoprene content greater than 80%.

The catalyst batch being used must be tested in order to determine the average relative rates of hydrogenation of 1,2-butadiene to 1,4-butadiene (S1) and 1,4-butadiene to 1,4-isoprene (S2). This determination is made by carrying out hydrogenation of a polymer with polybutadiene and polyisoprene blocks and measuring the conversion of the various mers over time. This can be carried out a number of ways. For example, using $^1$H NMR, the disappearance of the mers can be monitored as a function of batch residence time. This data can be used to measure rate constants for the disappearance of these mers assuming the hydrogenation is first order in the respective mer concentration. The ratio of these kinetic rate constants defines the selectivities.

Once the relative rates of hydrogenation or selectivities are known, the next step is to choose the desired polybutadiene block residual unsaturation ($RU_{Bd}$). This is usually chosen as low as possible, for instance, 0.2 to 0.5, preferably around 0.3. 0.3 is preferred because it takes quite a bit of time to reduce the residual unsaturation from 0.3 to 0.2 and a residual unsaturation of 0.3 in the polybutadiene block generally is sufficient to maintain sufficient stability for the product whereas in some cases 0.5 is not sufficient. The units of residual unsaturation are milliequivalents of double bonds per gram of polymer.

The next step is to choose the desired polyisoprene block residual unsaturation ($RU_{Ip}$). This is chosen so that there is a sufficient amount of unsaturation in the polyisoprene blocks. In the preferred embodiment of the present invention, the residual unsaturation of the polyisoprene blocks is chosen so that the polymer can be epoxidized to the desired degree and the epoxidation can be localized in the polyisoprene blocks. For a preferred polymer hereunder, the residual unsaturation of the polymer generally ranges from 1.6 to 2.2 milliequivalents per gram of polymer. Once the desired $RU_{Bd}$ and $RU_{Ip}$ are chosen, the total residual unsaturation ($RUT_{Tot}$) is necessarily defined.

At this point, there is sufficient information to calculate the ideal molecular weight ratio of the polyisoprene blocks to the polybutadiene blocks in the polymer which will give the desired product qualities and also require a minimum hydrogenation residence time. The relative rates of hydrogenation are determined by the following formulas:

$$S1 = \frac{k_{Bd12}}{k_{Bd14}} \tag{5}$$
= Relative Rate of Hydrogenation of 1, 2 Bd to 1, 4 Bd $$S1 = \frac{k_{Bd14}}{k_{Ip14}} \tag{6}$$
= Relative Rate of Hydrogenation of 1, 4 Bd to 1, 4 Ip where k is the actual first order reaction rate constant (1st order in mer concentration) of the microstructure mer described using the selected batch of catalyst.

The amount of 1,4-butadiene that is converted or hydrogenated is used herein because it provides the appropriate degree of stability in its various product applications. This is represented by the term 14BdC. The total butadiene conversion (TBdC) is defined by the 14BdC and the weight fraction of 1,2-butadiene ($V_{12}$) in the butadiene block in the following equation:

$$TBdC = 1-[(1-V_{12})(1-14BdC)+V_{12}(1-14BdC)^{S1}] \tag{7}$$

For the reasons discussed above, the 1,4-isoprene conversion (14IpC) is assumed to be the same as the total isoprene conversion (TIpC) and both are defined by the following formula:

$$14IpC = TIpC = 1-(1-14BdC)^{\frac{1}{S2}} \tag{8}$$

The total residual unsaturation in the polymer is the sum of the residual unsaturation of the polyisoprene and the residual unsaturation of the polybutadiene as shown by the following formula:

$$RU_{tot} = RU_{Ip} + RU_{bd} \tag{9}$$

The total weight fraction of butadiene mers in the polymer ($F_{Bd}$) plus the total weight fraction of the isoprene mers in the polymer ($F_{Ip}$) must equal 1:

$$F_{Bd} + F_{Ip} = 1 \tag{10}$$

The molecular weight of each butadiene unit in the polymer is 54. The molecular weight of each isoprene unit in the polymer is 68. In order to determine the RU from the weight fractions, one must divide the weight fractions of the respective unhydrogenated mers by their molecular weights and then multiply by 1000. Using this conversion and substituting equations (7) and (8) into equation (9) gives the following expression for total RU:

$$RU_{tot} = 1000\{[F_{Bd}((1-V_{12})(1-14BdC)+V_{12}(1-14BdC)^{S1})]/54 + [F_{Ip}(1-14BdC)^{1/S2}]/68\} \tag{11}$$

After designating the parameters for (11), equations (10) and (11) can be solved simultaneously to determine the weight fractions for Bd and Ip. To solve equation (10) and (11), the molecular weight of either the butadiene block or of the entire polymer must be designated. Molecular weight is chosen basis the particular product application for which the molecule is being defined. The mathematics of solving for the above equation are more straightforward if the butadiene block molecular weight is specified.

If butadiene block molecular weight is chosen, the 1,4-butadiene conversion is calculated directly after designating the final 1,4 butadiene residual unsaturation:

1,4-butadiene conversion=14BdC=1−{(Desired Residual Unsaturation for 1,4-butadiene)

×(Molecular Weight of Butadiene Block)}/{1000×(molecular weight of butadiene)×

(fraction of 1,4-butadiene)}=1−{(RU14)×(Molecular Weight of Butadiene Block)}/{1000 ×54×(1−$V_{12}$)} (12)

If the overall molecular weight of the polymer is specified, then the 1,4BdC is defined as 14BdC=1−{(Desired Residual Unsaturation for 1,4 Butadiene)× (Molecular Weight of Butadiene)}/{1000×(weight fraction of butadiene in the molecule)×(fraction of 1,4 butadiene in the butadiene block)}=1−$RU_{14}$×(54)/(1000×($F_{Bd}$)×(1−$V_{12}$)) (13)

In the case where overall molecular weight is specified, this expression for 14BdC must be substituted into the equation for total residual unsaturation (equation (11)). The analysis still produces two equations and two unknowns ($F_{bd}$, $F_{Ip}$), along with the equation 1=$F_{Bd}$+$F_{Ip}$. Once this is determined, the ratio is then used to define the molecular weights of the polyisoprene block.

Next, butadiene and isoprene are polymerized anionically to form a block copolymer which has the block molecular weights calculated above. Finally, this polymer is hydrogenated. The polyisoprene block of this polymer is of such a size that its time of hydrogenation will be minimized and the overall hydrogenation cycle time will also be minimized.

The relationships described above hold true regardless of the total molecular weight of the polymer desired. It works equally well for low molecular weight polymers, i.e., having a molecular weight under 10,000, and for higher molecular weight polymers, i.e., 10,000 to 200,000. The above methodology is not dependent upon the overall molecular weight of the polymer and other monomers can also be included in the backbone as long as they are non-reactive in the hydrogenation part of the process (e.g. styrene). The selectivity of the catalyst is generally in the range of 2 to 10 for 1,2-butadiene to 1,4-butadiene and 2 to 20 for 1,4-butadiene to 1,4-isoprene for the nickel and aluminum systems, although higher selectivities have been observed for both. Other hydrogenation catalysts with different selectivities could also be employed, leading to a polymer with a different blend of isoprene and butadiene if the minimal residence time criterion is applied.

The relative reaction rates and thus the selectivities may very well change during the hydrogenation process. If this occurs, then a more complicated calculation is necessary to find the optimum polyisoprene block molecular weight to achieve minimum process cycle time. A new expression involving the 1,4-butadiene conversion wherein the selectivity of the hydrogenation reaction changes and the new selectivity of that reaction, S2', is needed for an accurate calculation. The total RU equation takes on the form $$RU_{tot}=[1-(14BdC-X)/(1-X)]^{1/S2'} \times 1000\{[F_{ip}(1-X)^{1/S2}]/68\}+[1-(14BdC-X)/(1-X)] \times 1000\{[F_{bd}((1-V_{12})(1-X)+V_{12}(1-X)^{S1})]/54\} \quad (14)$$

where X=The degree of 1,4 Bd conversion at which the selectivity changes from S2 to S2'.

EXAMPLES

Example 1

Experiments to Measure Selectivity Between Butadiene and Isoprene Hydrogenation Three butadiene-isoprene block polymers, shown in Table 1, were prepared via anionic polymerization. The living end of the polymer was capped with stoichiometric amounts of ethylene oxide to give mono-ol functionality. The polymers were then each individually hydrogenated in the batch or semi-batch (i.e. polymer cement added to a batch reactor over 90 minutes time) mode of operation. Hydrogenation conditions for the three polymers are summarized in Table 1. The hydrogenation catalyst used was a nickel octanoate/triethyl aluminum catalyst with a nickel to aluminum ratio of 2.0. Catalyst was added initially and then at designated intervals during the batch hydrogenation to keep the hydrogenation rate high. A plot of 1,4-isoprene conversion versus 1,4-butadiene conversion for these three hydrogenations is summarized in FIG. 1. Conversions were determined using $^1$H NMR. The experimental data are plotted along side the curves that predict conversion using the theory discussed above. Equation (3) is evaluated in FIG. 1 using selectivies, represented by variable S2, of 6, 8, and 10. From FIG. 1 it is shown that the conversion data generally follow that predicted by theory over the range of process conditions studied. Also, the data appear to follow the curve defined by a selectivity of 8 to 10 between 0 and 80% conversion and a selectivity of less than 6 at greater than 80% conversion. Overall, the equations derived from the theory give an adequate representation of the selective hydrogenation process.

TABLE 1

Polymerization and Hydrogenation of Isoprene/Butadiene Block Copolymers

| | Polymerization | | | Hydrogenation | | | |
|---|---|---|---|---|---|---|---|
| Pilot Plant Number | Molecular Weight Isoprene Block | Molecular Weight Butadiene Block | Operating Mode | Temp Range (Celsius) | Hydrogen Pressure (psi) | Total Catalyst Usage (ppm Ni) | Polymer Solids (% w) |
| 5943 | 1800 | 4720 | Semi-Batch[1] | 70 to 72 | 700 | 35 | 17 |
| 5957 | 1190 | 6210 | Batch | 64 to 70 | 600 | 10 | 20 |
| 5984 | 1930 | 4980 | Batch | 75 to 88 | 600 | 8 | 20 |

[1]Cement was programmed to the batch reactor over 90 minutes.

Example 2

Characterization of the Hydrogenation Selectivities of a Nickel/Aluminum Catalyst Table 2 shows experimental data for a batch hydrogenation. The precursor to the hydrogenation process was an isoprene-butadiene block copolymer with alcohol functionality on one end of the molecule. The isoprene block molecular weight was 1180, and the butadiene block molecular weight was 5260. The fraction of 1,2-butadiene in the butadiene block was 46.7% while the fraction of 1,4-isoprene in the isoprene block was 87.9%. The hydrogenation was carried out using a total of 3 ppm nickel catalyst with a nickel to aluminum catalyst ratio of 2.0. The hydrogenation temperature started at 38° C., rose to a maximum of 70° C. in the first 45 minutes of hydrogenation, and leveled off to a temperature range of 60 to 75° C. for the remaining batch time. The pressure of the reactor was maintained at 700 psi. The data in Table 2 show the hydrogenation of the four mers as a function of hydrogenation time. The mer concentrations were measured using $^1$H NMR. First order rate constants (i.e., first order in mer concentration) were calculated at each data point using equation (1). The rate constants were generated using the previous data point at time "1" and the current data point for time "2". The selectivities S1 and S2 were then calculated from these rate constants. Note that the accurate estimation of the 1,2-butadiene rate constant is not possible after about 100 minutes because it has disappeared for all practical purposes. Also, predictions of the 1,4-isoprene early in the batch cycle are not considered accurate because the error in measuring these small changes introduces undue variation in the result. Per the data in Table 2, S1 has an average value of 3.5. S2 appears to be decreasing at batch times less than 100 minutes. Beyond 100 minutes, or greater than 80% 1,4 butadiene conversion or about 90% total butadiene conversion, S2 is steady with an average value of 2.96.

$$RU_{tot}=[1-(14BdC-X)/(1-X)]^{1/S2'} \times 1000\{[F_{ip}(1-X)^{1/S2}]/68\}+[1-(14BdC-X)/(1-X)]\times 1000\{[F_{bd}((1-V_{12})(1-X)+V_{12}(1-X)^{S1})]/54\}$$

TABLE 2

Data Used to Calculate Selectivities of Butadiene/Isoprene Block Copolymers

| Time (min) | Residual Unsaturation (meq/g) | | | | 1st Order Rate Constants (min-1) | | | Selectivities | |
|---|---|---|---|---|---|---|---|---|---|
| Run #80 | 1,4 Bd | 1,2 Bd | 1,4 Ip | 3,4 Ip | $k_{12Bd}$ | $k_{14Bd}$ | $k_{14Ip}$ | $S1 = k_{12Bd}$ | $S2 = k_{14Bd}/k_{14Ip}$ |
| 0 | 5.39 | 2.66 | 2.29 | 0.31 | | | | | |
| 30 | 3.67 | 0.71 | 2.28 | 0.28 | 0.044 | 0.0128 | 0.00015 | 3.44 | |
| 60 | 2.81 | 0.3 | 2.23 | 0.27 | 0.029 | 0.0089 | 0.00074 | 3.23 | |
| 90 | 1.59 | 0.05 | 2.03 | 0.24 | 0.06 | 0.019 | 0.0031 | 3.15 | 6.06 |
| 105 | 1.1 | 0.01 | 1.86 | 0.23 | 0.107 | 0.0246 | 0.0058 | 4.37 | 4.21 |
| 120 | 0.94 | 0.01 | 1.77 | 0.22 | | 0.0105 | 0.0033 | | 3.17 |
| 135 | 0.84 | 0 | 1.71 | 0.21 | | 0.0075 | 0.0023 | | 3.26 |
| 150 | 0.69 | 0 | 1.59 | 0.19 | | 0.0131 | 0.0049 | | 2.7 |
| 165 | 0.55 | 0 | 1.46 | 0.17 | | 0.0151 | 0.0057 | | 2.66 |
| 180 | 0.45 | 0 | 1.37 | 0.16 | | 0.0134 | 0.0042 | | 3.15 |
| 195 | 0.38 | 0 | 1.29 | 0.15 | | 0.0113 | 0.004 | | 2.81 |

Example 3

Determination of the Isoprene/Butadiene Block Size that Minimizes Hydrogenation Residence Time for a Residual Unsaturation Level of 1.6 meq/g for Isoprene In example 1, the selectivity of 1,4 butadiene to 1,4-isoprene (S2) was represented by a value between 6 and 10 when the 1,4-butadiene conversion was less than about 80%. For this example a value of 7.5 is used for S2 when the 1,4-butadiene conversion is less than 80%. In example 2, the selectivity of 1,4 butadiene to 1,4-isoprene after 80% 1,4 butadiene conversion (S2') was 2.96. An S2'value of 3 is used in this example. Also in example 2, the selectivity of 1,2-butadiene to 1,4-butadiene was estimated to be 3.5. To summarize, the selectivities used in this example are defined as follows: S1=3.5, S2=7.5, and S2'=3, where the transition between S2 and S2' occurs at 80% 1,4-butadiene conversion (this is parameter X in equation (14)).

With this information the relative amounts of isoprene and butadiene needed to meet a target residual unsaturation are calculated as follows. For this example, the target residual unsaturation in the butadiene block is 0.3 meq/g, and the target in the isoprene block is 1.6 meq/g. The butadiene block has a number average molecular weight of 4800, and the percentage of 1,2-butadiene is 48%. These choices are made for reasons pertaining to the intended use of the epoxidized version of this polymer (the residual isoprene is epoxidized). With these parameters, the appropriate proportions of butadiene and isoprene are calculated for the minimal hydrogenation residence time using equations (10) and (14). First the final conversion of the 1,4-butadiene is calculated from the defined parameters (equation (13)):

14BdC=1−{(Desired Residual Unsaturation for 1,4-butadiene)× (Molecular Weight of Butadiene Block) }/{1000×(molecular weight of butadiene)×(fraction of 1,4-butadiene)}=1−{(0.3 meq/g)×(4800)}/{1000×(54)×(0.52)}=0.95

Equation (14) (the 2nd total RU equation) is then used to calculate the appropriate fractions of isoprene and butadiene:

Substituting in the appropriate values for 14BdC (0.95), X (0.8), S2' (3), S2 (7.5), S1 (3.5), and $V_{12}$ (0.48) gives $$1.9 \text{ meq/g}=[1-(0.95-0.8)/0.2]^{1/3} \times 1000\{[F_{ip}(0.2)^{1/7.5}]/68\}+[1-(0.95-0.8)/0.2]\times 1000\{[F_{bd}((1-0.48)(0.2)+0.48(0.2)^{3.5})]/54\}$$

Carrying out the above arithmetic, equation (14) becomes $$1.90=7.47F_{ip}+0.489F_{bd}$$

Solving equation (14) with equation (10), $1=F_{ip}+F_{bd}$, gives a value of $F_{ip}=0.202$ and $F_{bd}=0.798$. Because the butadiene molecular weight was specified as 4800, the total molecular weight from butadiene and isoprene is 6015. The target length of the isoprene block is then 1215.

Example 4

Demonstration of Reproducible Selective Hydrogenation With the Minimum Residence Time In Table 3, subsequent batches of the isoprene-butadiene polymer are shown where the target isoprene/butadiene blend was that calculated in Example 3. The target isoprene block molecular weight, which includes the s-butyl lithium required for anionic polymerization (molecular weight of 64) plus the isoprene block (1215 from Example 3) was set at 1300. That is, the target molecular weight was calculated to be 64 plus 1215 to equal 1279. This number was rounded up to the nearest hundred for convenience. The data summaries shown in Table 3 (which includes data from other runs including that described in Example 2) show that for batches 82 through 90, the isoprene block molecular weight ranged between 1251 and 1368 with an average of 1306. This precision per the target of 1300 is within the experimental error of controlling the molecular weight in these anionic polymerizations. The average percentage of isoprene relative to butadiene was 19.7% for these batches, slightly below the target of 20.2%. The 1,2-butadiene fraction in the butadiene block ranged from 46.8 to 47.2%. Hence the precursors used in the hydrogenation study were similar to those targeted from the calculations made in Example 3. The hydrogenation results are given in Table 3 for 9 batches. In these batches the hydrogenation reaction was halted when the overall residual unsaturation, as determined by an ozonolysis titration, approached 1.9 meq/g. The results show that the resulting residual unsaturation of the 1,4 butadiene and total isoprene were very close to the targets of 0.3 and 1.6 meq/g, respectively, as defined in Example 3. Therefore, the target residual unsaturations of the isoprene block and the total polymer were reached by stopping when the target butadiene conversion was reached. Because no additional time was spent hydrogenating the isoprene block beyond this conversion of butadiene, the minimum hydrogenation residence time was obtained.

TABLE 3

Final Residual Unsaturation for Batch Hydrogenations With a Target Isoprene Block Molecular Weight of 1300

| Batch # | Isoprene Block MW | Fraction of Isoprene in Polymer 3) | Final R.U. (meq/g) | | | |
|---|---|---|---|---|---|---|
| | | | 1,4 Bd | 1,4 Ip | 3,4 Ip | Total |
| 82 | 1335 | 0.200 | 0.25 | 1.32 | 0.24 | 1.81 |
| 83 | 1298 | 0.195 | 0.29 | 1.44 | 0.24 | 1.98 |
| 84 | 1251 | 0.197 | 0.34 | 1.49 | 0.24 | 2.07 |
| 85 | 1287 | 0.202 | 0.27 | 1.51 | 0.25 | 2.03 |
| 86 | 1345 | 0.197 | 0.35 | 1.54 | 0.24 | 2.14 |
| 87 | 1297 | 0.199 | 0.25 | 1.45 | 0.26 | 1.96 |
| 88 | 1270 | 0.188 | 0.25 | 1.4 | 0.24 | 1.88 |
| 89 | 1368 | 0.202 | 0.28 | 1.59 | 0.25 | 2.13 |
| 90 | 1310 | 0.196 | 0.29 | 1.39 | 0.24 | 1.92 |

1) Isoprene Block Molecular Weights are taken from H$^1$NMR of Polymer After Synthesis.
2) 1,2 Bd Concentration is less than 0.01 meq/g for all of the polymers above
3) Calculated from H$^1$ NMR of Polymer After Synthesis. Fraction based on butadiene as the only other component.
4) The 3,4 Ip RU above includes a small amount of isomerized butadiene mer, per H$^1$NMR.

I claim:

1. A process for selectively hydrogenating a block copolymer having at least one butadiene polymer block and at least one isoprene polymer block with a hydrogenation catalyst that hydrogenates isoprene blocks and butadiene blocks at a different rate, comprising:
   a) choosing a desired polymer molecular weight and a desired level of residual unsaturation in the isoprene block(s) and in the butadiene block(s) and determining molecular weights of the butadiene block(s) and isoprene block(s) such that times required to hydrogenate the butadiene block(s) and isoprene block(s) with the hydrogenation catalyst to the desired levels of residual unsaturation are substantially the same;
   b) anionically polymerising butadiene and isoprene to form a block copolymer as determined in step (a), wherein the block copolymer comprises from about 40% to about 60% by weight of butadiene incorporated by 1.2-addition; and
   c) selectively hydrogenating the block copolymer with the hydrogenation catalyst until the butadiene block(s) and the isoprene block(s) have reached the desired levels of residual unsaturation wherein the desired level of residual unsaturation in the butadiene block is about 0.2 to 0.5 milliequivalents per gram of the block copolymer.

2. The method of claim 1, wherein the block copolymer comprises isoprene incorporated by 1,4-addition.

3. The method of claim 1, wherein the desired overall polymer molecular weight is less than about 200,000.

4. The method of claim 1, further comprising epoxidizing the block copolymer.

5. A method for producing hydrogenated block copolymers having at least one polybutadiene block, at least one polyisoprene block, and a specified amount of residual unsaturation in the polyisoprene block wherein hydrogenation residence time is minimized, comprising:
   a) determining average relative rates of hydrogenation of butadiene incorporated by 1,2addition to butadiene incorporated by 1,4-addition (S1) and butadiene incorporated by 1,4-addition to isoprene incorporated by 1,4-addition (S2) for a particular batch of hydrogenation catalyst to be used, including significant rate changes as conversion increases;
   b) choosing a desired polybutadiene block residual unsaturation ($RU_{Bd}$);
   c) choosing a desired polyisoprene block residual unsaturation ($RU_{Ip}$) and calculating the desired total residual unsaturation ($RU_{Tot}$);
   d) choosing a desired overall polymer molecular weight or a desired butadiene block molecular weight;
   e) determining a relative molecular weight ratio of the polyisoprene blocks to the polybutadiene blocks from an equation of:

$$RU_{Tot}=1000((F_{Bd}((1-V_{12})(1-14BdC)+V_{12}(1-14BdC)^{S1}))/54+(F_{Ip}(1-14BdC)^{1/S2})/68)$$

whereby $F_{Bd}$ is the weight fraction of polybutadiene in the polymer, $F_{Ip}$ is the weight fraction of polyisoprene in the polymer, $V_{12}$ is the weight fraction of 1,2-addition in the polybutadiene blocks, and 14BdC is the fraction of butadiene incorporated by 1,4-addition which is hydrogenated, thereby defining the overall polymer molecular weight and the polybutadiene and polyisoprene block molecular weights,
   f) anionically polymerizing butadiene and isoprene to form a block copolymer having the block molecular weights as determined in step (e); and
   g) hydrogenating the block copolymer to the desired polybutadiene residual unsaturation.

6. The method of claim 5, wherein the block copolymer comprises from about 40% to about 60% by weight of the butadiene incorporated by 1,2-addition.

7. The method of claim 5, wherein the block copolymer comprises greater than about 80% by weight of the isoprene incorporated by 1,4-addition.

8. The method of claim 5, wherein the desired level of residual unsaturation in the butadiene block is about 0.2 to 0.5 milliequivalents per gram of the block copolymer.

9. The method of claim 5, wherein the desired overall polymer molecular weight is less than about 200,000.

10. The method of claim 5, wherein the desired polyisoprene block residual unsaturation is about 1.6 to 2.2 milliequivalents per gram of the block copolymer.

11. The method of claim 5, further comprising epoxidizing the block copolymer.

12. A method for producing hydrogenated block copolymers having at least one polybutadiene block, at least one polyisoprene block, and a specified amount of residual unsaturation in the polyisoprene block wherein hydrogenation residence time is minimized when a relative rate of hydrogenation of butadiene incorporated by 1,4-addition to isoprene incorporated by 1,4-addition changes as conversion of butadiene incorporated by 1,4-addition increases, which comprises:

a) determining an average relative rate of hydrogenation of butadiene incorporated by 1,2-addition to butadiene incorporated by 1,4-addition (S1) and butadiene incorporated by 1,4-addition to isoprene incorporated by 1,4-addition (S2, S2') for a particular batch of hydrogenation catalyst to be used, including significant rate changes as conversion increases;

b) choosing a desired polybutadiene block residual unsaturation ($RU_{Bd}$);

c) choosing a desired polyisoprene block residual unsaturation ($RU_{Ip}$) and calculating the desired total residual unsaturation ($RU_{Tot}$);

d) choosing a desired overall polymer molecular weight or a desired butadiene block molecular weight;

e) determining a relative molecular weight ratio of the polyisoprene blocks to the polybutadiene blocks from an equation of:

$$RU_{Tot}=(1-(14BdC-X)/(1-X))^{1/S2'} \times 1000((F_{ip}(1-X)^{1/S2})/68)+(1-(14BdC-X)/(1-X)) \times 1000((F_{bd}((1-V_{12})(1-X)+V_{12}(1-X)^{S1}))/54)$$

where X is the degree of Bd conversion of butadiene incorporated by 1,4-addition at which the selectivity changes from S2 to S2', FBd is the weight fraction of polybutadiene in the polymer, $F_{ip}$ is the weight fraction of polyisoprene in the polymer, $V_2$ is the weight fraction of 1,2-addition in the polybutadiene blocks, and 14BdC is the fraction of butadiene incorporated by 1,4-addition which is hydrogenated, thereby defining an overall polymer molecular weight and the polybutadiene and polyisoprene block molecular weights;

f) anionically polymerizing butadiene and isoprene to form a block copolymer having the block molecular weights as determined in step (c); and g) hydrogenating the block copolymer to the desired polybutadiene residual unsaturation.

13. The method of claim 12, wherein the block copolymer comprises from about 40% to about 60% by weight of the butadiene incorporated by 1,2-addition.

14. The method of claim 12, wherein the block copolymer comprises greater than about 80% by weight of the isoprene incorporated by 1,4-addition.

15. The method of claim 12, wherein the desired level of residual unsaturation in the butadiene block is about 0.2 to 0.5 milliequivalents per gram of the block copolymer.

16. The method of claim 12, wherein the desired overall polymer molecular weight is less than about 200,000.

17. The method of claim 12, wherein the desired polyisoprene block residual unsaturation is about 1.6 to 2.2 milliequivalents per gram of the block copolymer.

18. The method of claim 12, further comprising epoxidizing the block copolymer.

* * * * *